US006584053B1

United States Patent
Tsukihashi

(10) Patent No.: US 6,584,053 B1
(45) Date of Patent: Jun. 24, 2003

(54) DISK RECORDING SYSTEM

(75) Inventor: Akira Tsukihashi, Gunma (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 09/335,674

(22) Filed: Jun. 18, 1999

(30) Foreign Application Priority Data

Jul. 22, 1998 (JP) ............................................. 10-206548

(51) Int. Cl.[7] ................................................ G11B 7/00
(52) U.S. Cl. ............................... 369/53.34; 369/47.28; 369/59.1
(58) Field of Search ........................... 369/47.33, 53.34, 369/30.23, 47.28, 44.23, 47.54, 59.26, 47.31, 47.41, 44.26, 44.28, 47.45, 47.25; 360/70.2; 710/57, 22; 711/110, 113, 133

(56) References Cited

U.S. PATENT DOCUMENTS

| 5,177,720 A | * | 1/1993 | Kondo | 360/72.1 |
| 5,212,678 A | | 5/1993 | Roth et al. | 369/47.33 |
| 5,315,571 A | | 5/1994 | Maeda et al. | 369/47.41 |
| 5,343,455 A | | 8/1994 | Takeuchi et al. | 369/59.26 |
| 5,463,607 A | * | 10/1995 | Roth et al. | 369/30.23 |
| 5,583,838 A | | 12/1996 | Itoh | 369/47.31 |
| 5,765,187 A | * | 6/1998 | Shimizu et al. | 710/22 |
| 5,778,420 A | * | 7/1998 | Shitara et al. | 710/57 |
| 6,055,216 A | * | 4/2000 | Shintani | 369/47.31 |
| 6,198,707 B1 | * | 3/2001 | Yamamoto | 369/47.25 |

FOREIGN PATENT DOCUMENTS

| EP | 0520381 A2 | 12/1992 | |
| EP | 0726571 A1 | 8/1996 | |
| EP | 0825602 A2 | 2/1998 | |
| JP | 03-228266 | 10/1991 | |
| JP | 6-315660 | 11/1994 | ........... G11B/20/10 |
| JP | 08-147879 | 6/1996 | |
| JP | 10-049990 | 2/1998 | |
| JP | 10-063433 | 3/1998 | |

OTHER PUBLICATIONS

Notice of Grounds for Rejection for Japanese Patent Application Ser. No. Hei 10–206548; Examiner: Takashi Komatsu (Jun. 28, 2000).

* cited by examiner

Primary Examiner—William Korzuch
Assistant Examiner—Kim-Kwok Chu
(74) Attorney, Agent, or Firm—Hogan & Hartson, LLP

(57) ABSTRACT

When a buffer underrun decision circuit decides that a buffer underrun is about to occur, data recording on the disk is interrupted by a recording control circuit. On the other hand, when the buffer underrun decision circuit determines that a buffer underrun situation has been avoided, data recording is resumed by the recording control circuit. At this time, data recording is resumed from a position of the disk which is continuous to data recorded by the time the data recording was interrupted, thereby recording new data continuous to the last recorded data.

6 Claims, 2 Drawing Sheets

DISK RECORDING SYSTEM

BACKGROUND OF THE INVENTION

1. Field of the Invention

The present invention relates to a disk recording system which allows data to be recorded in addition to already recorded data, and relates in particular to a disk recording system which ensures continuity of recorded data even when buffer underruns occur.

2. Description of Related Art

An optical disk recording system for recording data on a disk has been known in which a light beam is irradiated from an optical head onto a disk to change the reflectivity of a recording layer of the disk and thereby record data on the disk. Among such optical disk recording systems, a CD-R (recordable) drive of the CD (Compact Disc) family is a well known example in which a write-once medium that prohibits physical erasure of already recorded data is employed.

This write-once medium such as a CD-R, however, has a problem of buffer underruns in which a rate of data transfer for inputting data to a buffer does not keep up with a rate of data transfer for recording data on the medium, and this in turn leads to buffer underrun errors which cause the recorded data to be discontinuous. In the case of disc-at-once or track-at-once medium in which file groups to be written are previously designated, the recording medium cannot be used when such a buffer underrun error occurs.

Such buffer underrun error has become more likely to occur as the recording rate in CD-R drives has increased to be higher than 4 or 8 times the standard rate, and as personal computers are more often operated using multi-task functions. Accordingly, buffer underrun error is becoming a serious problem.

On the other hand, in a packet write system, data can be recorded by each packet, and therefore data recording is suspended until the data to be recorded fill the capacity of each packet, thereby preventing a buffer underrun error to occur. This is disclosed in, for example, Japanese Patent Registered Publication No. 2842262.

Here, it is necessary to ensure a compatibility between a CD-R drive and a CD-ROM drive such that data recorded on a disk by a CD-R drive can be reproduced by a CD-ROM drive. However, a problem of this compatibility is also unsolved because the packet write system is not always applicable to CD-ROM drives.

Further, when a CD-R drive records audio data corresponding to a CD-DA, a packet write system is not applicable to the CD-R drive due to a compatibility with a CD-DA player.

In a packet write system, because link blocks must be formed for connecting packets, there is also a problem of disk storage capacity.

SUMMARY OF THE INVENTION

According to the present invention, data to be added are synchronized by signal synchronizing means with data which have already been recorded on a disk and are then recorded at a recording start position on the disk detected by recording start position detecting means. Therefore, it is possible, when data recording is resumed, to record new data on the disk such that the new data are continuous to the data which have been recorded by the time data recording was interrupted. The added data can be reproduced in a manner continuous to the already recorded data without adoption of a packet write system. In this way, a disk recording system which can record data on a disk while ensuring a compatibility with other disk reproducing systems can be provided.

Further, if it is determined that buffer underruns are about to occur, data recording to a disk can be interrupted. Then, once it is determined that a situation in which buffer underruns are about to occur has been avoided, recording is resumed at a position from which new data can be recorded continuous to the last data which were recorded immediately before the interruption of data recording. Accordingly, a buffer underrun error by which data are recorded on a disk discontinuously can be prevented, and therefore the recorded data are reproducible, even on a disk reproducing system which can only read disks having continuously recorded data.

Further, in a disk recording system for recording data to which interleave processing is applied, data to be modulated are stored by an encoder when recording is interrupted to secure an interleave length necessary for new data to be inputted when recording is resumed. Therefore, even if data are interleaved, it is possible to modulate new data when recording is resumed such that they are continuous to the last data which have been recorded on a disk immediately before the interruption of recording.

Further, a recording start position may be detected by determining an address of the last frame of the data recorded on a disk while referring to the address stored immediately before the interruption of recording. Therefore, as a process previous to a detection of a position at which recording is resumed, it is possible to reliably and quickly detect the position of the last data recorded immediately before the interruption of recording, whereby the position where recording is resumed can be detected reliably and quickly.

In particular, the recording start position is detected by detecting an address of the data corresponding to one frame previous to the last frame of the data recorded immediately before the interruption of recording and counting channel bits using, as a reference, a frame synchronizing signal firstly detected after the aforementioned address is detected. Therefore, it is possible to additionally record new data on a disk in a manner continuous to the data recorded immediately before the interruption of recording.

Further, as an operation clock used for system control, a reproducing clock obtained by reproducing a pit signal may be used until the recording start position is detected, and when the recording start position is detected, the reproducing clock is switched to a recording clock used for data recording. Therefore, it is possible to make new data to be recorded on the disk synchronized with the data already recorded on the disk and to immediately initiate system control by means of a recording clock once a non-recorded region of the disk where a reproducing clock is not available is detected.

BRIEF DESCRIPTION OF THE DRAWINGS

These and other objects of the invention will be explained in the description below, in connection with the accompanying drawings, in which.

DETAILED DESCRIPTION OF PREFERRED EMBODIMENT

The preferred embodiment of the present invention will be described in further detail with reference to the accompanying drawings.

Figure 1:
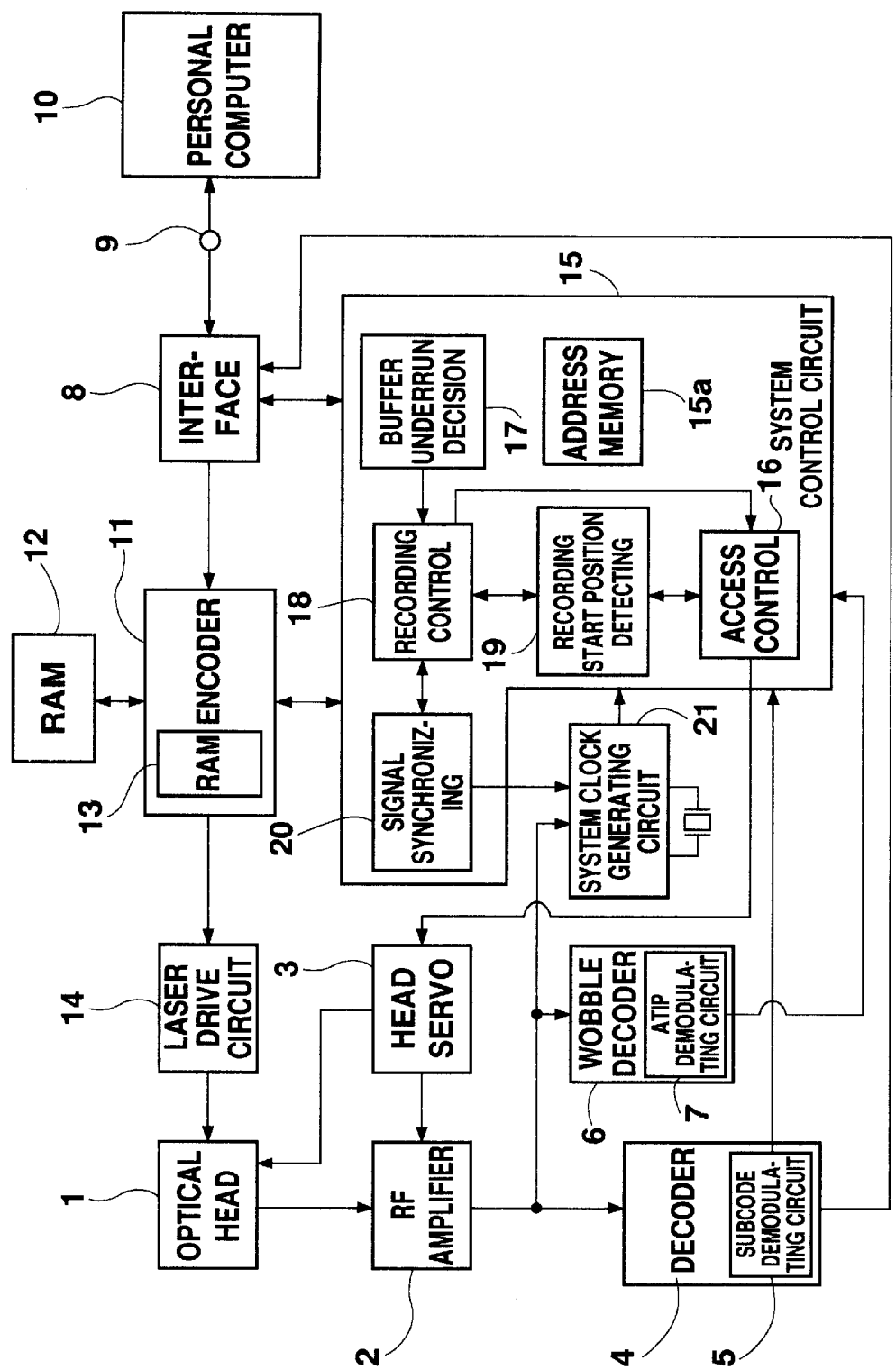
FIG. 1 is a block circuit diagram showing an example of a CD-R drive employed in a disk recording system according to the present invention.

FIG. 1 is a block circuit diagram showing an example of a CD-R drive of a disk recording system according to the present invention.

In FIG. 1, reference numeral 1 denotes an optical head which irradiates a laser beam to trace a disk for writing/ reading data onto/from the disk, while numeral 2 denotes an RF amplifier for amplifying an RF signal (a high frequency signal) obtained from the optical head which reads recorded data on the disk, and for coding the RF signal as binary data to be then output as digital data. Reference numeral 3 denotes a head servo which performs focusing control for feeding back an output of the optical head 1 via the RF amplifier 2 so as to focus a laser beam on a signal surface of the disk and tracking control so that the laser beam will follow a signal track of the disk, as well as thread feeding control for moving the optical head 1 in the radial direction of the disk.

Numeral 4 denotes a decoder for demodulating the digital data output from the RF amplifier 2 and 5 denotes a subcode demodulating circuit for demodulating a separated subcode.

Numeral 6 denotes a wobble decoder having an ATIP (Absolute Time In Pre-groove) demodulating circuit 7 which extracts wobble components of 22.05 kHz from a pre-groove signal of a disk obtained via the RF amplifier 2 to generate components required for rotation control of the disk and also demodulates an ATIP from the wobble components.

Numeral 8 denotes an interface which controls, via a connection terminal 9, data transmission and data reception to and from a host personal computer 10 connected outside the system. Numeral 11 denotes an encoder which modulates data input thereto via the interface 8 into recording data to be recorded in the disk and 12 denotes an input data RAM for storing input data to be modulated by the encoder 11.

When the encoder 11 modulates data based on the CD-ROM standard, a sync, a header, an EDC (Error Detection Code), and an ECC(Error Correction Code) for CD-ROM data are added to the input data. Subsequently, a process with a CIRC (Cross Interleaved Reed-Solomon Code) which is an error correction code of a CD system is applied while a subcode is added, and further EFM (Eight to Fourteen Modulation) is performed and a synchronizing signal is added.

Numeral 13 denotes an internal RAM which is provided inside the encoder 11 and is used for modulation processing by the encoder 11. Numeral 14 denotes a laser drive circuit for driving a laser source of the optical head 1 so as to perform data recording based on the recording data of the EFM data outputted from the encoder 11.

Numeral 15 denotes a system control circuit which performs system control with regard to disk recording and reproducing. Specifically, the system control circuit comprises an access control means 16 for controlling access by selectively referring to a subcode address of absolute time information in a subcode (sub Q data), which is demodulated by the subcode demodulating circuit 5, and to an ATIP address of absolute time information in ATIP which is demodulated by the ATIP demodulating circuit 7; buffer underrun decision means 17, which monitors data capacity stored in the input data RAM 12 for determining that buffer underruns are about to occur in which the data transfer rate for data input cannot keep up with the data transfer rate for recording data on the disk and therefore data to be recorded become inadequate or that the situation in which buffer underruns are about to occur has been avoided; recording control means 18 for controlling data recording on the disk in accordance with a decision made by the buffer underrun decision means; recording start position detecting means 19 for detecting the leading end of the non-recorded region on the disk in which no data are recorded to detect a recording start position at which the recording control means 18 starts data recording; and signal synchronizing means 20 for synchronizing new data to be recorded with the data which are already recorded on the disk by using a synchronizing signal of the subcode extracted by the decoder 4 and the sub Q data demodulated by the subcode demodulating circuit 5. The system control circuit 15 may be a microcomputer operating as each of the aforementioned means through execution of software instructions. It may be preferable, however, for any of the aforementioned means to be hardware circuits.

Numeral 21 denotes a system clock generating circuit for generating an operation clock which is used for system control of the entire operation for disk recording and reproducing, the circuit comprising two PLL (Phase Lock Loop) circuits for selectively establishing synchronization with a reproducing clock obtained by reproducing EFM data outputted from the RF amplifier 2 or with a reference clock having an accuracy of a quartz oscillator.

Figure 2:
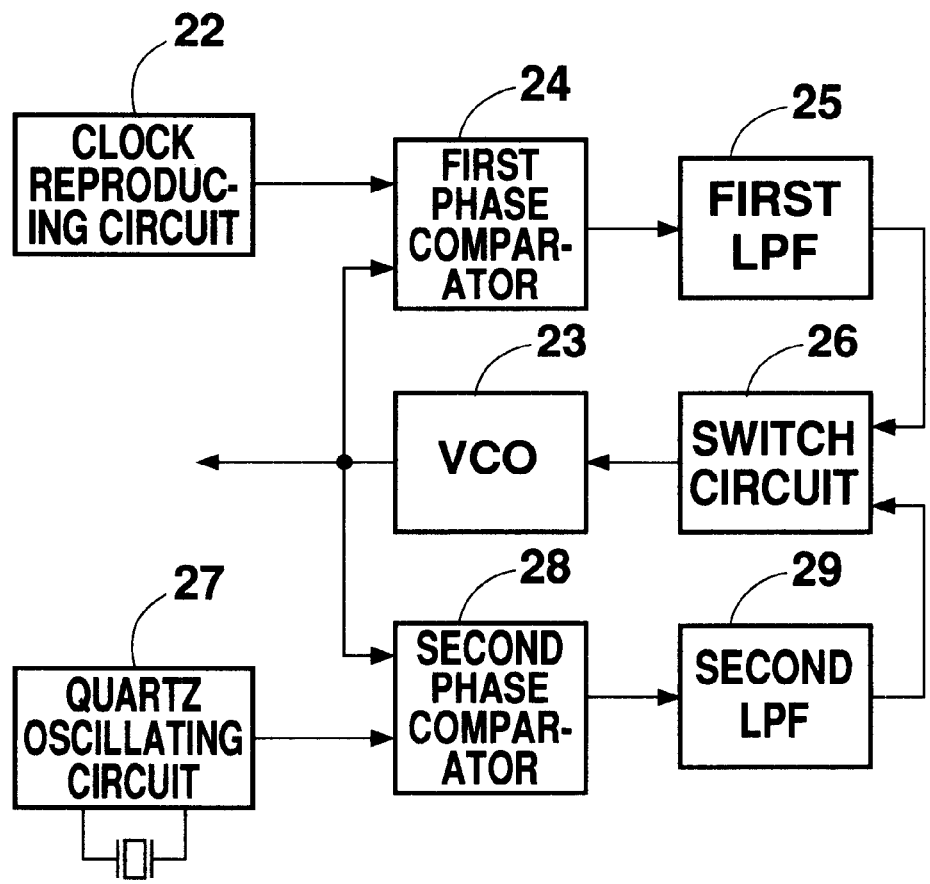
FIG. 2 is a circuit block diagram showing a detailed structure of a system clock generator 21.

As shown in FIG. 2, the system clock generating circuit 21 comprises a reproducing clock system for use in reproducing operation and a reference clock system for use in recording operation. The reproducing clock system is constituted by a PLL circuit in which the phase of a reproducing clock reproduced by a clock reproducing circuit 22 and the phase of an output from a VCO (Voltage Control Oscillator) 23 are compared with each other by a first phase comparator 24, which then generates an output voltage in accordance with a phase shift between the reproducing clock and the output from the VCO 23, and the output voltage is converted, by a first LPF (low pass filter) 25, into a dc voltage, which is fed back to the VCO 23 via a switch circuit 26. On the other hand, the reference clock system is constituted by a PLL circuit in which the phase of a reference clock generated by a quartz oscillating circuit 27 and the phase of an output from the VCO 23 are compared with each other by a second phase comparator 28, which then generates an output voltage in accordance with a phase shift between the reference clock and the output from the VCO 23, and the output voltage is converted, by a second LPF 29, into a d.c. voltage, which is fed back to the VCO 23 via the switch circuit 26.

In the disk recording system thus constituted, the recording operation is executed as follows. First, the personal computer 10 operates to allow data recording on the disk, thereby generating commands in accordance with the operation. The commands are then inputted via the interface 8 and recognized by the system control circuit 15 to perform recording operation.

When performing recording operation, the switch circuit 26 is switched by the signal synchronizing means 20 such that the reference clock system operates, and the system clock generator 21 is in the condition in which a reference clock is generated. Thus, each circuit shown in FIG. 1 is now ready to operate in synchronism with a reference clock.

Specifically, the optical head 1 is controlled such that a laser output for performing disk reproduction reads a pre-groove signal of the disk. After the pre-groove signal read by the optical head 1 is subjected to wave-shaping by the RF amplifier 2, the wobble components are extracted by the wobble decoder 6 from the signal, and an ATIP is demodulated from the wobble components by the ATIP demodulating circuit 7.

Data output from the personal computer 10 to be recorded on the disk are supplied via the interface 8 to the encoder 11, which modulates the data into suitable recording data.

When the laser beam for tracing from the optical head 1 reaches a write area on the disk, data to be recorded are sequentially output by each EFM frame from the encoder 11, and address data indicating the address of the corresponding output data are sequentially updated and stored in the address memory 15a of the system control circuit 15.

The laser drive circuit 14 drives a laser source of the optical head 1 based on the recording data output from the encoder 11, thereby recording the data on the disk.

When recording data on the disk, the system clock generator 21 generates a reference clock, and data recording is performed by each predetermined frame in synchronism with the reference clock.

During data recording, however, when the data transfer rate for outputting data from the personal computer 10 lags behind the data transfer rate for writing the data on the disk, or, in other words, when the transfer rate for inputting data to the encoder 11 becomes slower than the transfer rate for outputting data from the encoder 11, the data amount stored in the RAM 12 decreases.

This condition would eventually result in the RAM 12 for storing data becoming empty. If this occurs, the buffer underrun decision means 17 determines that buffer underruns are about to occur, thereby generating a decision signal indicating this situation. In response to this decision signal, the recording control means 18 determines the interruption of the recording on the disk and the output of data from the encoder 11 is interrupted. Simultaneously, the optical head 1 terminates irradiating a writing beam, to thereby interrupt the data recording on the disk. Here, it is also possible that the buffer underrun decision means 17 determines that buffer underruns are about to occur when it detects that the data stored in the RAM 12 is less than a predetermined amount.

When data output from the encoder 11 is interrupted, the address data corresponding the address of the last frame of the data which were output from the encoder 11 immediately before the interruption of recording are stored in the address memory 15a of the system control circuit 15. Thus recorded address data are constituted by time information of Q channel data of a subcode (sub Q data) and address information indicating the position (No. of data) in an EFM frame in the time information. In accordance with the address data stored in the address memory 15a, the signal synchronizing means 20 manages the hour, minute, and frame of the time information in the sub Q data and the position of an EFM frame in the time information the address of the last frame of the data recorded on the disk indicates.

Under this condition, when new data are input to the encoder from the personal computer 10, the access control means 16 accesses the data which had been recorded on the disk before data recording was interrupted using the ATIP demodulated by the ATIP demodulating circuit 7, and the optical head 1 begins tracing. The tracing may be started, for example, from the position several tracks before the address stored in the address memory 15a.

In this tracing process, a pit signal on the disk formed by recording data on the disk is read out. When the EFM data can be obtained form the read pit signals, the system clock generating circuit 21 is switched by the signal synchronizing means 20 from the condition where a reference clock is generated to the condition where a reproducing clock in synchronism with the EFM data is generated. Accordingly, each circuit shown in FIG. 1 turns to be operated in synchronism with the reproducing clock and the encoder 11 is also ready to perform a modulation process in synchronism with the reproducing clock.

The encoder 11 comprises the internal RAM 13 for storing data to be modulated. The internal RAM 13 is configured such that data necessary for CIRC processing is secured when the data recording is interrupted so as to secure the interleave length (maximally 108 frames for EFM frames) necessary for newly input data. Here, it is also possible to increase the capacity of the buffer 12 to be used as a memory for securing the interleave length, thereby omitting the internal RAM 13.

When the encoder 11 is ready to perform modulation processing in synchronism with the reproducing clock, the recording data to be output from the encoder 11 are synchronized with the data already recorded on the disk using a synchronization signal of a subcode extracted by the decoder 4 and sub Q data demodulated by the subcode demodulating circuit 5 by the signal synchronizing means 20. By means of the recording control means 18, the encoder 11 is turned into a standby status for outputting data corresponding a frame next to the last frame of the data recorded on the disk immediately before the interruption of recording while referring to the address data stored in the address memory 15a.

When the encoder 11 is in the standby status, the recording start position detecting means 19 detects the leading end position of the non-recorded region of the disk immediately after the recorded region in which data are already recorded, by referring to the address data stored in the address memory 15a.

The position of the leading end in the non-recorded region is detected based on the time information of sub Q data and the EFM frame position in the time information. For the subcode frame (a collection of 98 units of EFM frames), detection is performed by the sub Q data, whereas, for the EFM frame, channel bits are counted one at a time using a synchronization signal as a reference, thereby determining the terminal end of the last frame of the data recorded on the disk. Here, it is previously determined how many channel bits constitute one frame.

When the leading end of the non-recorded region is detected, the system clock generating circuit 21 is immediately switched by the signal synchronizing means 20 from the status in which a reproducing clock in synchronism with the EFM data is generated to the status in which a reference clock is generated. Now, the reference clock becomes an operation clock for the encoder 11.

Here, the system clock generating circuit 21 has the construction shown in FIG. 2. Specifically, a reproducing clock generated by the clock reproducing circuit 22 is inputted in the first phase comparator 24 where the phase of the reproducing clock is compared with the phase of an output from the VCO 23. The comparison result outputted from the first phase comparator 24 is inputted via the first LPF 25 into the switch circuit 26.

On the other hand, a reference clock generated by a quartz oscillating circuit 27 is inputted in the second phase comparator 28 where the phase of the reference clock is compared with the phase of an output from the VCO 23. The comparison result outputted from the second phase comparator 28 is inputted via the second LPF 29 into the switch circuit 26

The switch circuit 26 selects the first LPF 25 until the leading end position of the non-recorded region of the disk is detected. Accordingly, in this condition, the first phase comparator 24, first LPF 25 and the VCO 23 operate as a phase locked loop (PLL) for a reproducing clock while the system clock generating circuit 21 outputs a reproducing clock as an operation clock for the system.

On the other hand, when the leading end position of the non-recorded region is detected, the switch circuit 26 is switched such that the second LFP 29 is selected. Accordingly, in this condition, the second phase comparator 28, second LPF 29 and the VCO 23 operate as a phase locked loop (PLL) for a reference clock while the system clock generating circuit 21 outputs a reference clock as an operation clock for the system.

When the switch circuit 26 is switched, a control voltage for controlling the VCO 23 is gradually changed to a voltage of the selected PLL due to a time constant of the first LPF 25 or the second LPF 29. Therefore, when the condition is switched from where a reproducing clock is generated to where a reference clock is generated, a system clock generated from the system clock generating circuit 21 is also changed gradually from a reproducing clock to a reference clock.

Simultaneously with the switching of a system clock, the recording control means 18 allows data to be output from the encoder 11, thereby resuming the data recording on the disk.

In this case, synchronism has been established between the data to be outputted from the encoder 11 and the data already recorded on the disk, and the encoder 11 outputs data corresponding a frame next to the frame of the data recorded by the time data recording was interrupted. Accordingly, data recording is resumed from the position of the disk which is continuous to the last data recorded by the time recording was interrupted, and new data corresponding a frame subsequent to the frame of the last recorded data can be recorded.

The foregoing embodiment has a structure which assumes that a disk having data recorded by a constant linear velocity (CLV) is rotationally controlled by the same method and therefore a reference clock is generated as a system clock used for recording operation. However, in the case where a disk having data recorded by a linear velocity constant method is rotationally controlled by a constant angular velocity (CAV), a clock in synchronism with wobble components extracted by the wobble decoder 6 may be generated as a system clock for use in the recording operation.

While the preferred embodiment of the present invention has been described using specific terms, such description is for illustrative purposes only, and it is to be understood that changes and variations may be made without departing from the spirit or scope of the appended claims.

What is claimed is:

1. A data recording system for recording data on a disk, comprising:
   an encoder for modulating input data into recording data suitable to be recorded on a disk;
   a recording control circuit for controlling interruption and resumption of data recording on the disk;
   a recording start position detecting circuit for detecting, as a recording start position on the disk, a position continuous to the trailing end of data which have been recorded discontinuously on the disk due to the interruption of recording, when the recording is resumed after the interruption of recording by the recording control circuit;
   a signal synchronizing circuit for synchronizing data to be additionally recorded on the disk and output from said encoder with the data recorded on the disk, in order to output, from said encoder, data to be additionally recorded on the disk which is continuous to the data recorded on the disk immediately before the interruption of recording; and
   a system clock generating circuit for generating, as an operation clock for use in the operational control of said encoder, a reproducing clock obtained by reproducing the recorded data while the data to be additionally recorded which is output from said encoder is synchronized by said signal synchronizing circuit, and for generating, as said operation clock, a recording clock when said recording start position detecting circuit detects said recording start position; wherein
   said system clock generating circuit supplies a reproducing clock to said encoder as the operation clock before said recording start position is detected by said recording start position detecting circuit;
   said data to be additionally recorded which is output from said encoder is synchronized with the data already recorded on the disk by said signal synchronizing circuit while said encoder executes a modulation processing operation synchronous with the reproducing clock; and
   when said recording start position is detected by said recording start position detecting circuit, the operation clock supplied from said system clock generating circuit to said encoder is switched from said reproducing clock to a recording clock, and then, output of data to be additionally recorded from said encoder is resumed to resume the recording on the disk.

2. A data recording system of claim 1, further comprising a buffer for storing said input data,
   wherein said buffer underrun detecting circuit detects buffer underruns by monitoring the amount of data amount stored in said buffer.

3. A data recording system as defined in claim 1,
   wherein said encoder has a memory for storing the input data and
   wherein said memory has a capacity required for securing a necessary interleave length for new data to be input when data recording is resumed.

4. A data recording system for recording data on a disk, comprising:
   an encoder for modulating input data into recording data suitable to be recorded on a disk;
   a recording control circuit for controlling interruption and resumption of data recording on the disk;
   a recording start position detecting circuit for detecting, as a recording start position on the disk, a position continuous to the trailing end of data which have been recorded discontinuously on the disk due to the interruption of recording, when the recording is resumed after the interruption of recording by the recording control circuit;
   a signal synchronizing circuit for synchronizing data to be additionally recorded on the disk and output from said encoder with the data recorded on the disk, in order to output, from said encoder, data to be additionally recorded on the disk which is continuous to the data recorded on the disk immediately before the interruption of recording;
   wherein the data are recorded on/the disk in frame units, and said recording start position detecting circuit sequentially stores addresses corresponding to the latest data to be recorded on the disk and detects the recording start position by detecting the last frame address of the data stored on the disk while referring to the address of the data stored immediately before the interruption of data recording onto the disk;

wherein said recording start position detecting circuit detects the recording start position by detecting the address of the data recorded on the disk immediately before the interruption of data recording and, after the address is detected, counting channel bits using a frame synchronization signal as a reference; and a system clock generating circuit for generating, as an operation clock for use in the operational control of said encoder, a reproducing clock obtained by reproducing the recorded data while the data to be additionally recorded which is output from said encoder is synchronized by said signal synchronizing circuit, and for generating, as said operation clock, a recording clock when said recording start position detecting circuit detects said recording start position; wherein said system clock generating circuit supplies a reproducing clock to said encoder as the operation clock before said recording start position is detected by said recording start position detecting circuit;

said data to be additionally recorded which is output from said encoder is synchronized with the data already recorded on the disk by said signal synchronizing circuit while said encoder executes a modulation processing operation synchronous with the reproducing clock; and when said recording start position is detected by said recording start position detecting circuit, the operation clock supplied from said system clock generating circuit to said encoder is switched from said reproducing clock to a recording clock, and then, output data to be additionally recorded from said encoder is resumed to resume the recording on the disk.

5. A data recording system for recording data on a disk, comprising:

an encoder for modulating input data into recording data suitable to be recorded on a disk;

a recording control circuit for controlling interruption and resumption of data recording on the disk;

a recording start position detecting circuit for detecting, as a recording start position on the disk, a position continuous to the trailing end of data which have been recorded discontinuously on the disk due to the interruption of recording, when the recording is resumed after the interruption of recording by the recording control circuit;

a signal synchronizing circuit for synchronizing data to be additionally recorded on the disk and output from said encoder with the data recorded on the disk, in order to output, from said encoder, dated to be additionally recorded on the disk which is continuous to the data recorded on the disk immediately before the interruption of recording;

wherein the data are recorded on the disk in frame units, and said recording start position detecting circuit sequentially stores addresses corresponding to the latest data to be recorded on the disk and detects the recording start position by detecting the last frame address of the data stored on the disk while referring to the address of the data stored immediately before the interruption of data recording onto the disk;

wherein said recording start position detecting circuit detects the recording start position by detecting the address corresponding a frame which is one previous to the last frame of the data recorded on the disk immediately before the interruption of data recording and counting channel bits using, as a reference, a frame synchronization signal which is first detected after the detection of the address; and a system clock generating circuit for generating, as an operation clock for use in the operational control of said encoder, a reproducing clock obtained by reproducing the recorded data while the data to be additionally recorded which is output from said encoder is synchronized by said signal synchronizing circuit, and for generating, as said operation clock, a recording clock when said recording start position detecting circuit detects said recording start position; wherein said system clock generating circuit supplies a reproducing clock to said encoder as the operation clock before said recording start position is detected by said recording start position detecting circuit;

said data to be additionally recorded which is output from said encoder is synchronized with the data already recorded on the disk by said signal synchronizing circuit while said encoder executes a modulation processing operation synchronous with the reproducing clock; and when said record starting position is detected by said recording start position detecting circuit, the operation clock supplied from said system clock generating circuit to said encoder is switched from said reproducing clock to a recording clock, and then, output data to be additionally recorded from said encoder is resumed to resume the recording on the disk.

6. A data recording system for recording data on a disk, comprising:

an encoder for modulating input data into recording data suitable to be recorded on a disk;

a recording control circuit for controlling interruption and resumption of data recording on the disk;

a recording start position detecting circuit for detecting, as a recording start position on the disk, a position continuous to the trailing end of data which have been recorded discontinuously on the disk due to the interruption of recording, when the recording is resumed after the interruption of recording by the recording control circuit;

a signal synchronizing circuit for synchronizing data to be additionally recorded on the disk and output from said encoder with the data recorded on the disk, in order to output, from said encoder, dated to be additionally recorded on the disk which is continuous to the data recorded on the disk immediately before the interruption of recording;

wherein the data are stored on the disk as a pit signal, wherein, as an operation clock for use in system operation, a reproducing clock obtained by reproducing said pit signal is used until the recording start position is detected by the recording start position detecting circuit and said reproducing clock is switched to a recording clock for use in recording data when the recording start position is detected by said recording start position detecting circuit; and a system clock generating circuit for generating, as an operation clock for use in the operational control of said encoder, a reproducing clock obtained by reproducing the recorded data while the data to be additionally recorded which is output from said encoder is synchronized by said signal synchronizing circuit, and for generating, as said operation clock, a recording clock when said recording start position detecting circuit detects said recording start position; wherein said system clock generating circuit supplies a reproducing clock to said encoder as the operation clock before said recording start position is detected by said recording start position detecting circuit;

said data to be additionally recorded which is output from said encoder is synchronized with the data already recorded on the disk by said signal synchronizing circuit while said encoder executes a modulation processing operation synchronous with the reproducing clock; and when said recording start position is detected by said recording start position detecting circuit, the operation clock supplied from said system clock generating circuit to said encoder is switched from said reproducing clock to a recording clock, and then, output data to be additionally recorded from said encoder is resumed to resume the recording on the disk.

\* \* \* \* \*